United States Patent [19]

McNeill et al.

[11] 4,451,123
[45] May 29, 1984

[54] HIGH FREQUENCY LIGHT MODULATION DEVICE

[75] Inventors: William H. McNeill, Carlisle; Yung J. Chen, Weston, both of Mass.

[73] Assignee: GTE Laboratories Incorporated, Waltham, Mass.

[21] Appl. No.: 451,647

[22] Filed: Dec. 20, 1982

[51] Int. Cl.³ .............................................. G05D 25/02
[52] U.S. Cl. ...................................... 350/386; 350/485
[58] Field of Search ............... 350/386, 359, 363, 355, 350/353, 374, 485

[56] References Cited

U.S. PATENT DOCUMENTS 3,514,183  5/1980  Rabedeau ........................... 350/160
4,165,155  8/1979  Gordon et al. ....................... 350/285

OTHER PUBLICATIONS

Gordon, II; J. G. et al., "Electrochromic Attenuated Total Reflection Modulator", IBM Tech. Disclosure Bull., vol. 22, No. 5 (Oct. 1979), p. 2074.
Burstein; E. et al., "Surface Polaritons—Propagating Electromagnetic Modes at Interfaces", J. Vac. Sci. Technol., vol. 11, No. 6, Nov./Dec. 1974, pp. 1004–1018.
Philpott, et al., "Light Valve Utilizing Surface Polaritons", IBM Tech. Disclosure Bull., vol. 22, No. 8A, Jan. 1980, pp. 3350.
Kirtley; J. R. et al., "Polarized, Angle-Tunable Light Source", IBM Tech. Disclosure Bull., vol. 23, No. 7A, Dec. 1980, pp. 3004–3005.

Primary Examiner—Bruce Y. Arnold
Attorney, Agent, or Firm—Jerry F. Janssen; Fred Fisher

[57] ABSTRACT

An electrooptic device for controlling the intensity of a monochromatic light beam comprises a first transparent element such as a triangular prism or hemicylindrical prism having a planar surface. A thin layer of a material such as a metal is in contact with the planar surface of the transparent element and a semiconductor material is adjacent to the metal layer. A voltage source provides a potential difference between the metal layer and the semiconductor material to alter the charge density in the semiconductor material to affect the degree of coupling between the light beam entering the device and surface plasmon waves generated within the device to correspondingly control the intensity of the light beam exiting the device.

22 Claims, 4 Drawing Figures

HIGH FREQUENCY LIGHT MODULATION DEVICE

CROSS-REFERENCE TO RELATED APPLICATIONS

This application discloses and claims subject matter related to subject matter disclosed and claimed in copending application Ser. No. 451,646 entitled "High Frequency Light Modulator", filed concurrently herewith in the names of William H. McNeill and Y. J. Chen and assigned to the present assignee.

BACKGROUND OF THE INVENTION

This invention relates to electrooptical devices. More particularly, it is concerned with electrooptical devices and methods for the rapid modulation of a collimated light beam.

Devices are known in the art which modulate a polarized light beam by means of the combination of a Kerr cell and a Glan-Thomson prism (see, for example, U.S. Pat. No. 3,501,220 to Bernal et al.). These devices employ the Kerr effect to rotate the plane of a polarized light beam as it passes through an electrooptic cell to which an alternating electric field is applied. The light is then passed through the Glan-Thomson prism to deflect the light along one path or another depending upon the state of polarization. Devices of this type require relatively high voltages for their operation, typically of the order of several hundred volts.

Other light modulation devices are known in which a transducer physically moves one or more of the elements of the device to modulate the light beam (see, for example, U.S. Pat. No. 3,514,183 to Rabedeau). U.S. Pat. No. 4,165,155 to Gordon, II et al. discloses a device for modulating a collimated light beam employing an optically transparent element such as a prism separated from a smooth metal surface by a gap filled with a medium, such as air, having a refractive index less than that of the prism. A light beam passing through the prism is modulated by mechanically varying the spacing of the gap between the prism face and the smooth metal surface by means of, for example, a piezoelectric transducer. The frequency response of devices of the type where one or more elements of the system must be physically moved is limited by the rate at which the elements of the system can be mechanically oscillated.

OBJECTS AND SUMMARY OF THE INVENTION

It is therefore an object of the present invention to provide a device and method for electrooptically varying the intensity of a collimated light beam which obviates the need to physically move elements of the device to modulate the light beam.

It is a further object of the present invention to provide a device and method for electrooptically varying the intensity of a collimated light beam which is capable of very high modulation frequencies.

It is another object of the present invention to provide an electrooptic device which operates at comparatively low applied voltages to rapidly modulate a collimated light beam.

These and other objects are achieved in accordance with the present invention wherein an electrooptic device for varying the intensity of a collimated monochromatic light beam comprises a first element having a first planar surface and which is transparent to the monochromatic light beam. A second element of a material of negative dielectric constant is in contact with the planar surface of the first element to form an interface. A third element of a semiconductor material is adjacent to the second element, and a means is provided for varying the charge density of a semiconductor material in the third element. Variation in the charge density of semiconductor material in the third element affects the degree of coupling between the monochromatic light beam incident upon the interface and surface plasmon waves generated in the second and third elements to correspondingly vary the intensity of the collimated monochromatic light beam.

For a better understanding of the present invention together with other and further objects, advantages and capabilities thereof, reference is made to the following disclosure and appended claims in connection with the above-described drawing figures.

DETAILED DESCRIPTION

The device of the present invention provides a novel means for rapidly varying the intensity of a collimated light beam by rapid variation of the degree of coupling between a light beam incident to a surface and surface plasmons generated by the light beam within the device. Surface plasmons are electromagnetic waves which propagate along the interface between two media but which decrease exponentially in amplitude with the distance perpendicularly from the interface. (For a detailed discussion of surface plasmons see, for example, E. Burstein et al., J. Vac. Sci. Technol., Vol. 11, No. 6, pp. 1004–1019, 1974.) Depending upon a variety of parameters, the coupling of the incident light beam with the surface plasmons is strong or weak. When conditions favor strong coupling between the light beam and the surface plasmons, the light beam loses much of its energy to the surface plasmon wave, and the reflected light beam is correspondingly attenuated. On the other hand, when the coupling is weak, there is correspondingly little attenuation of the light beam, and most of the energy is reflected from the interface.

Figure 1:
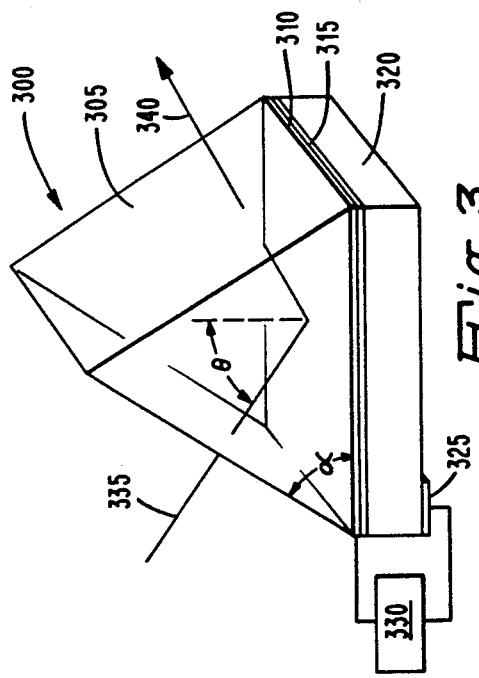

Referring to FIG. 1, there is shown one embodiment of the device of the present invention. As shown there, the device 100 comprises a transparent element 105 fabricated from a material which is transparent to the wavelength of the light beam which is to be affected. The element is made of any suitable vitreous, plastic, or single-crystal material which is transparent in the desired region of the electromagnetic spectrum. For example, in one particular application, the device of this invention is useful for the control of a collimated laser light beam in optical fiber communications. It is known that light of approximately 1 micron wavelength is preferred for optical fiber communications because of the low decibel losses when light of this wavelength is transmitted through glass fibers. In such an application, the same glass is employed for fabrication of the transparent element of the device and the optical fibers.

As shown in the embodiment illustrated in FIG. 1, the element 105 is in the form of a right triangular prism, and a thin layer 120 of a material of negative dielectric constant is in direct contact with the flat base of the transparent prism element 105. Layer 120 is preferably a metal selected from the group including aluminum, silicon, nickel, copper, zinc, palladium, silver, cadmium, platinum, gold, and mixtures thereof. The metal is deposited on the base of the prism element 105 by sputtering, vapor deposition, plating, or other techniques well known in the art. The thickness of the metal layer is preferably between about 100–500 Angstrom units, more preferably between about 200–300 Angstrom units.

In the embodiment shown in FIG. 1, a layer of semiconductor material 125 such as doped silicon, gallium arsenide, and the like contacts the metal layer 120 to form a rectifying junction between the two layers. A voltage source 150 provides a voltage through connections to the metal layer 120 and to the semiconductor layer 125 through ohmic contact 145.

When a monochromatic light beam 110 enters the transparent prism element 105 at the proper incident angle, $\theta$, it establishes a surface plasmon wave in the metal layer 120. The wave extends a finite distance into the semiconductor material 125 underlying the metal layer 120. Coupling between the incident light beam 110 and surface plasmon waves generated in the metal layer 120 and the semiconductor 125 occurs when the angle of incidence, $\theta$, has the value:

$$\theta = \arcsin \frac{1}{n_p} Re\left(\frac{e_b e_c}{e_b + e_c}\right)^{\frac{1}{2}}$$

where $n_p$ is the refractive index of the prism material, $e_b$ is the complex term of the dielectric constant of the metal, $e_c$ is the complex term of the dielectric constant of the semiconductor material, and Re is the real term corresponding to the fraction $e_b e_c/(e_b+e_c)$. Although the indicent light beam 110 may enter the prism element 105 at an angle which deviates slightly from normal to surface 135 of the prism, it is preferred that the light beam 110 enter the prism element 105 at an angle which is normal to surface 135. In this preferred embodiment, the prism angle, $\alpha$, is correspondingly chosen to be equal to the angle, $\theta$.

If conditions favor the formation of a surface plasmon wave, the exiting light beam 115, reflected from the surface 130 of the metal layer 120, is considerably attenuated through energy loss from the incident light beam 110 to the surface plasmon wave. Application of a small potential between the metal layer 120 and the semiconductor 125 results in the formation of either a depletion-/inversion of accumulation layer in the semi-conductor 125 in the region immediately adjacent to the metal layer 120. This alteration in the charge density of the semiconductor material affects the degree of coupling between the incident light beam 110 and the surface plasmon wave by partially or completely destroying the wave. A decrease in coupling results in greater intensity of the reflected light beam 115. The magnitude of the charge density in the semiconductor material in the region supporting a plasmon wave is proportional to the applied voltage across the thin metal layer 120 and the semiconductor 125.

In one application of the device of this invention, light beam 110 is modulated by applying a small voltage signal of complex waveform between the semiconductor material 125 (through ohmic contact 145) and the thin metal layer 120. The resulting modulation of the charge density in the semiconductor material 125 modulates the exiting light beam 115 in such a manner that its intensity varies with the same waveform. Since no elements of the device are physically moved to modulate the light beam, the frequency response to the device is high.

In an alternative application of the device of this invention, the device is operated as a bi-stable switching device which may be fabricated in a normally-on or normally-off embodiment. By the terms "normally-on" or "normally-off", the reference is to the exiting light beam 115.

If the entering light beam 110 exits the prism element 105 with little or no loss to a coupled surface plasmon wave in the metal layer 120, the device is operating in a normally "on" mode. The prism angle, and the angle of incidence, $\theta$, of the normally-on embodiment are chosen so that, in accordance to the relationship given above, a surface plasmon wave is not established. Application of the appropriate direct current voltage signal between the metal layer 120 and the semiconductor material 125 alters the charge density of the semiconductor material in the immediate vicinity of the metal layer 120 so as to alter the dielectric constant $e_c$ of the semiconductor to support the establishment of a surface plasmon wave. Once established, energy loss from the entering light beam 110 to the surface plasmon wave turns the exiting light beam 115 "off".

In the "normally-off" embodiment, the prism angle, $\alpha$, and the angle of incidence, $\theta$, of entering light beam 110 are chosen to support the establishment of a surface plasmon wave in the device, in accordance with the relationship given above. Under this condition, the energy of entering light beam 110 is transferred to the surface plasmon wave and little or no light exits the prism element 105. The application of a small direct current voltage signal between the metal layer 120 and the semiconductor material 125 destroys the surface plasmon wave and light beam 115 exiting the prism element 105 is turned "on".

Figure 2:
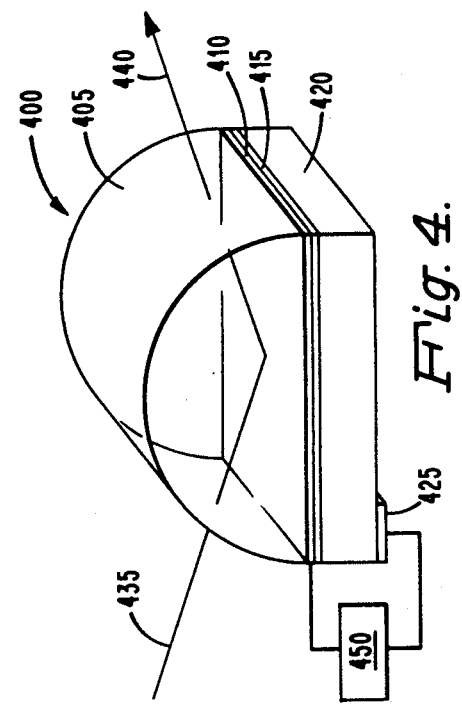

In FIG. 2, there is shown an alternative embodiment of the device of this invention where the transparent element 205 is in the form of a hemicylindrical prism. This embodiment permits the adjustment of the entering angle of incident light beam 210 to match the preferred incident angle to establish coupling with the surface plasmon. The other elements of the device pictured in FIG. 2, including the thin metal layer 220, the semiconductor element 225, voltage source 250 an ohmic contact 245 correspond in structure and function to similar elements in the embodiment pictured in FIG. 1.

Figure 3:
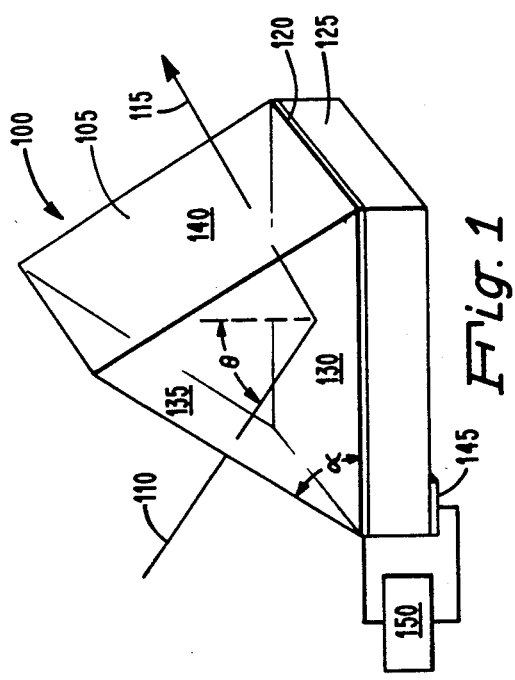
FIGS. 1-4 are schematic representations of various embodiments of the device of the present invention.
Figure 4:
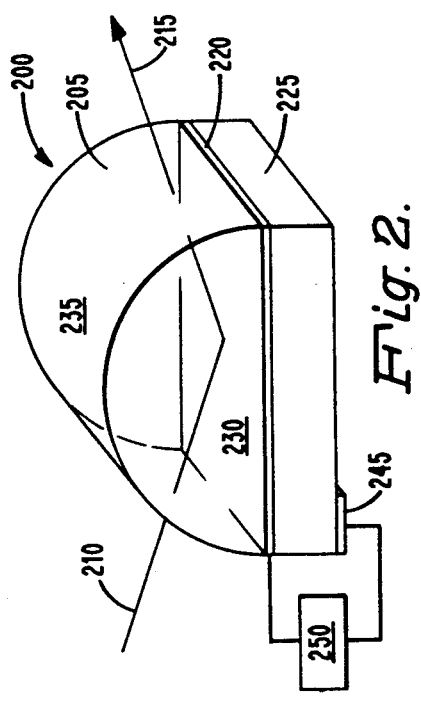

In FIGS. 3 and 4 are shown alternative embodiments of the device of this invention in which transparent elements 305 and 405 correspond to similar elements 105 and 205 in FIGS. 1 and 2, respectively. In the embodiment illustrated schematically in FIG. 3, a thin layer of metal 310 is in contact with the planar face of the prism element 305. Contiguous with the thin metal layer 310 is a thin layer 315, preferably up to about 100 Angstrom units in thickness, of an electrically non-conducting material such as a metal oxide. Contiguous with the non-conducting layer 315 is a layer of semiconductor material 320. Voltage source 330 provides a small voltage difference between the metal layer 310 and the semiconductor material 320. Since the non-conducting layer 315 prevents current flow between the metal layer 310 and the semiconductor material 320, the polarity of the applied voltage may be in either direction. As discussed above, the application of a voltage may be in either direction. As discussed above, the application of a voltage results in the production of either a depletion-/inversion layer or an accumulation layer in the semiconductor material in the region immediately adjacent to the nonconducting layer 315. The change in charge density of the semiconductor material correspondingly affects the degree of coupling between a light beam incident to the prism/metal layer interface and the surface plasmon wave generated in the metal layer and which extends down into the non-conducting material and the semiconductor material.

The embodiment in FIG. 4 employs a hemicylindrical element 405. The thin metal layer 410, non-conducting layer 415, semiconductor material 420, voltage source 450, and ohmic contact 425 correspond in structure and function to similar elements illustrated in FIG. 1.

While there have been shown and described what are at present believed to be the preferred embodiments of the present invention, it will be obvious to one of ordinary skill in the art to which the invention relates that various changes and modifications may be made therein without departing from the scope of the invention as defined by the appended claims.

What is claimed is:

1. An electrooptic device for varying the intensity of a collimated monochromatic light beam, said device comprising a first element transparent to said monochromatic light beam and having a planar surface; a second element of a material of negative dielectric constant in contact with said planar surface to form an interface therewith; a third element of a semiconductor material adjacent to said second element; and means for varying the charge density of semiconductor material in said third element to affect the degree of coupling between said monochromatic light beam incident upon said interface and surface plasmon waves generated in said second and third elements whereby the intensity of said collimated monochromatic light beam varies with the charge density.

2. An electrooptic device in accordance with claim 1 wherein said first element is a prism having a triangular shape.

3. An electrooptic device in accordance with claim 1 wherein said first element is a prism having a hemicylindrical shape.

4. An electrooptic device in accordance with claim 1 wherein said second element is a thin layer of a metal selected from the group consisting of aluminum, silicon, nickel, copper, zinc, palladium, silver, cadmium, platinum, gold, and mixtures thereof.

5. An electrooptic device in accordance with claim 4 wherein said thin layer of metal is of a thickness between about 100 Angstrom units and 500 Angstrom units.

6. An electrooptic device in accordance with claim 5 wherein said thin layer of metal is of a thickness between about 200 Angstrom units and 300 Angstrom units.

7. An electrooptic device in accordance with claim 1 wherein said means for varying the charge density in said semiconductor element includes means for generating a variable voltage between said second element and said third element.

8. An electrooptic device for varying the intensity of a collimated monochromatic light beam, said device comprising a first element transparent to said monochromatic light beam and having planar surface; a second element comprising a thin layer of metal in contact with said planar surface to form an interface therewith; a third element of a semiconductor material contiguous with said second element to form a rectifying barrier therebetween; and means for applying voltage signals reverse biasing said second element with respect to said third element to affect the degree of coupling between said monochromatic light beam incident upon said interface and surface plasmon waves generated in said second and third elements whereby the intensity of said collimated monochromatic light beam varies with the charge density.

9. An electrooptic device in accordance with claim 8 wherein said first element is a prism having a triangular shape.

10. An electrooptic device in accordance with claim 8 wherein said first element is a prism having a hemicylindrical shape.

11. An electrooptic device in accordance with claim 8 wherein said second element is a thin layer of a metal selected from the group consisting of aluminum, silicon, nickel, copper, zinc, palladium, silver, cadmium, platinum, gold, and mixtures thereof.

12. An electrooptic device in accordance with claim 11 wherein said thin layer of metal is of a thickness between about 100 Angstrom units and 500 Angstrom units.

13. An electrooptic device in accordance with claim 12 wherein said thin layer of metal is of a thickness between about 200 Angstrom units and 300 Angstrom units.

14. An electrooptic device for varying the intensity of a collimated monochromatic light beam, said device comprising a first element transparent to said monochromatic light beam and having a planar surface; a second element comprising a thin layer of metal in contact with said planar surface to form an interface therewith; a third element comprising a thin layer of an electrically non-conductive material contiguous with said second element; a fourth element of a semiconductor material contiguous with said third element; and means for applying voltage signals between said second element and said fourth element to vary the charge density of semiconductor material in said fourth element to affect the degree of coupling between said monochromatic light beam incident upon said interface and surface plasmon waves generated in said second, third, and fourth elements whereby the intensity of said collimated monochromatic light beam varies with the charge density.

15. An electrooptic device in accordance with claim 14 wherein said first element is a prism having a triangular shape.

16. An electrooptic device in accordance with claim 14 wherein said first element is a prism having a hemicylindrical shape.

17. An electrooptic device in accordance with claim 14 wherein said second element is a thin layer of a metal selected from the group consisting of aluminum, silicon, nickel, copper, zinc, palladium, silver, cadmium, platinum, gold, and mixtures thereof.

18. An electrooptic device in accordance with claim 17 wherein said thin layer of metal is of a thickness between about 100 Angstrom units and 500 Angstrom units.

19. An electrooptic device in accordance with claim 18 wherein said thin layer of metal is of a thickness between about 200 Angstrom units and 300 Angstrom units.

20. A method of modulating the amplitude of a monochromatic light beam in an apparatus having a first element transparent to said monochromatic light beam and having a planar surface; a second element of a material of negative dielectric constant in contact with said planar surface to form an interface therewith; a third element of a semiconductor material adjacent to said second element; said method comprising the steps of:

passing a monochromatic light beam into said first element at an angle of incidence to said planar surface to undergo reflection at said surface; and varying the charge density of semiconductor material in said third element to change the reflectivity of said monochromatic light beam.

21. A method in accordance with claim 20 wherein said step of varying the charge density of said semiconductor material includes varying the voltage of an electrical signal applied between said second element and said third element.

22. The method as recited in claim 20 wherein said step of varying the charge density comprises the steps of forming a rectifying junction between said second element and said third element; and applying a positive or negative voltage across said second element and said third element to form an accumulation layer or depletion layer, respectively.

* * * * *